United States Patent
Filev et al.

(10) Patent No.: US 9,081,651 B2
(45) Date of Patent: Jul. 14, 2015

(54) ROUTE NAVIGATION WITH OPTIMAL SPEED PROFILE

(71) Applicant: FORD GLOBAL TECHNOLOGIES, LLC, Dearborn, MI (US)

(72) Inventors: Dimitar P. Filev, Novi, MI (US); John O. Michelini, Sterling Heights, MI (US); Steven J. Szwabowski, Northville, MI (US); Perry R. McNeille, Lathrup Village, MI (US); Stefano Di Cairano, Somerville, MA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 294 days.

(21) Appl. No.: 13/799,934

(22) Filed: Mar. 13, 2013

(65) Prior Publication Data

US 2014/0277835 A1 Sep. 18, 2014

(51) Int. Cl.
| | | |
|---|---|---|
| *B60T 8/32* | (2006.01) | |
| *G06F 17/00* | (2006.01) | |
| *G01C 21/34* | (2006.01) | |
| *B60K 31/00* | (2006.01) | |

(52) U.S. Cl.
CPC ............. *G06F 17/00* (2013.01); *B60K 31/00* (2013.01); *G01C 21/3469* (2013.01); *B60K 2310/24* (2013.01)

(58) Field of Classification Search
USPC ........... 701/2, 36, 37, 65, 70, 93, 96, 99, 408, 701/410, 415, 123
See application file for complete search history.

(56) References Cited

U.S. PATENT DOCUMENTS 5,913,917 A 6/1999 Murphy
6,990,401 B2 1/2006 Neiss et al.
(Continued)

FOREIGN PATENT DOCUMENTS

DE 102006056631 A1 6/2008
JP 2009133779 A 6/2009
(Continued)

OTHER PUBLICATIONS

Wallaeger, J.; Kumar, S.A.; Onori, S.; Filev, D.; Ozguner, U.; Rizzoni, G.; Di Cairano, S.; "Cloud-computing based velocity profile generation for minimum fuel consumption: A dynamic programming based solution," American Control Conference (ACC), 2012, vol., No., pp. 2108-2113, Jun. 27-29, 2012.

*Primary Examiner* — Kim T Nguyen
(74) *Attorney, Agent, or Firm* — Gregory P. Brown; MacMillan, Sobanski & Todd, LLC (57) ABSTRACT

Energy consumption of a vehicle is optimized while traveling a route assembled of road segments between a first position and a destination. A speed profile generator is located at least partially off of the vehicle and uses an energy consumption model of the vehicle together with road grade data corresponding to the route to calculate an optimal speed profile. The speed profile specifies target speeds for respective locations on the route for traversing the route with an optimized energy consumption. The speed profile generator compares energy consumption for a plurality of feasible speed profile trajectories between a maximum trajectory and a minimum trajectory in order to identify the optimal speed profile. A speed updater is responsive to a current position of the vehicle and the optimal speed profile to initiate the target speed for the current position.

34 Claims, 6 Drawing Sheets

(56) References Cited

U.S. PATENT DOCUMENTS

| | | |
|---|---|---|
| 8,050,856 B2 | 11/2011 | Duty et al. |
| 2004/0093264 A1 | 5/2004 | Shimizu |
| 2010/0198508 A1 | 8/2010 | Tang |
| 2011/0184642 A1* | 7/2011 | Rotz et al. ............... 701/201 |
| 2011/0196817 A1 | 8/2011 | Pryakhin et al. |
| 2012/0010767 A1 | 1/2012 | Phillips et al. |
| 2012/0221234 A1 | 8/2012 | Sujan et al. |
| 2014/0222259 A1* | 8/2014 | Yoshimoto et al. ........... 701/20 |

FOREIGN PATENT DOCUMENTS

| | | |
|---|---|---|
| WO | WO2005062276 A1 | 7/2005 |
| WO | WO2009051407 A2 | 4/2009 |
| WO | WO2009106852 A1 | 9/2009 |

* cited by examiner

ROUTE NAVIGATION WITH OPTIMAL SPEED PROFILE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a method and apparatus for controlling the speed of transportation vehicles to optimize energy efficiency, and, more specifically, to cloud-based computing to define optimal speed profiles based on an identified route and corresponding road conditions such as road grade.

Vehicle manufacturers continually strive to minimize energy consumption for driving a vehicle (e.g., maximizing the distance driven per unit of gas for a gasoline vehicle or unit of electrical charge for an electrically-driven vehicle). Important influences on efficiency include the speed at which the vehicle is driven, road grade variations over the driven route, and traffic conditions. Automatic speed control (i.e., cruise control) systems can have a beneficial impact on fuel economy by reducing the amount of time spent accelerating the vehicle, especially during highway driving. Maintaining a single speed setting during uphill and downhill road grades, however, consumes more fuel than if the vehicle speed is allowed to vary in order to take advantage of road grade variations to optimize fuel consumption. If upcoming changes in road grade are known in advance (such as from GPS-based maps and advance routing), then temporary offsets can be introduced in the speed setting that accordingly improve energy consumption. As a new grade topology is approached, speed changes can be identified and implemented to reduce the energy consumed to traverse it. Due to their limited scope or horizon, however, prior art systems for modifying vehicle speed based on nearby grade changes achieve limited efficiency improvements.

SUMMARY OF THE INVENTION

In some embodiments, the invention provides a speed control system utilizing information from the driver (e.g., a destination and chosen route) along with other available sources of information available from on-board and off-board databases (e.g., geographic and traffic data) to provide an electronic horizon or preview of the path ahead of the car and an optimized speed profile to reduce energy consumption over the route. External information sources such as V2V, intelligent transportation systems (ITS), and public internet sites may be accessed to obtain required information (such as real time traffic). Due to the high computational load, off-board computational resources are used to apply the data to predictive models of vehicle energy consumption. Combining all of these available information sources with information about the driver's destination and preferred travel time, a recommended vehicle speed profile is created which results in optimal fuel efficiency between the present location and the destination. Route selection may be based on evaluating fuel consumption for different possible routes.

The present invention calculates the optimal vehicle speed profile using dynamic programming to determine the optimal vehicle speed profile over a predefined path by considering deterministic information about the local traffic volumes and speeds and various characteristics of the road (e.g., the road grade) along the path which is applied to a model of vehicle fuel consumption. Since dynamic programming is computationally intensive, it is beyond the computational capacity that is available on-board the vehicle. The invention uses resources available wirelessly (e.g., via the internet) and downloads the results to the vehicle for application by the speed control system. The optimal speed profile enhances fuel economy above what is available from traditional speed control systems which target a constant speed.

In one aspect of the invention, a system for optimizing energy consumption of a vehicle comprises a route calculator for assembling road segments into a route from a first position to a destination. A speed profile generator is located at least partially off of the vehicle and uses an energy consumption model of the vehicle together with road grade data corresponding to the route to calculate an optimal speed profile. The speed profile specifies target speeds for respective locations on the route for traversing the route with an optimized energy consumption. The speed profile generator compares energy consumption for a plurality of feasible speed profile trajectories between a maximum trajectory and a minimum trajectory in order to identify the optimal speed profile. A speed updater is responsive to a current position of the vehicle and the optimal speed profile to initiate the target speed for the current position.

DETAILED DESCRIPTION OF PREFERRED EMBODIMENTS

The present invention is an optimal fuel economy advisor employing cloud-based resources for finding an optimal speed profile resulting in improved real-world fuel economy. The invention uses various types of available information including route data, road grade, traffic, and vehicle information in a dynamic programming (DP) process or any other deterministic optimization technique for finding a speed profile optimizing fuel economy. A precise recommended target speed value is provided for implementation either directly within an adaptive cruise control or by providing the recommended speed to the driver via a heads-up display, haptic feedback, or other perceptible means. A speed profile covering the entire route being followed to a current destination is considered all at once in order to achieve the best average fuel economy.

Figure 1:
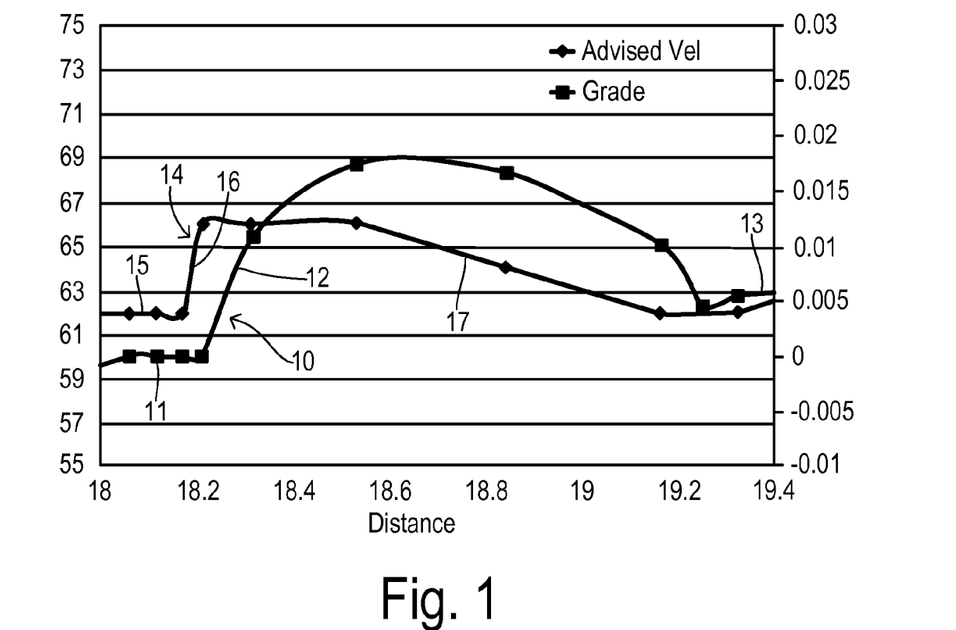
FIG. 1 is a plot showing a speed profile compared to a changing road grade wherein the speed profile results in better fuel economy than a constant speed.

FIG. 1 illustrates a curve 10 representing a changing road grade which has a relatively level (0% grade) portion 11 prior to entering a steep up-hill grade portion 12. Subsequently, the grade falls off to a more gentle down-hill slope then finally up-hill at portion 13. The road grade may be traversed by a vehicle with a lower energy consumption (as compared to following a constant speed) if it follows a speed profile 14. The vehicle is initially following a steady speed at a portion 15. Prior to reaching increased grade portion 12, speed profile 14 increases while on a level road grade at section 16 so that the steeper road grade is entered at a faster speed. While traversing the section of increasing grade, the vehicle speed profile gradually decreases along section 17 thereby consuming less overall energy to drive the vehicle.

Prior systems are known which detect upcoming road grade based on the current position of a vehicle, but they have considered only a limited distance or particular upcoming grade feature. Therefore, it has not been possible to find the best possible reduction of energy consumption. By considering road grade all the way to a destination and by including many other parameters affecting fuel economy, the present invention achieves significantly better fuel savings.

Figure 2:
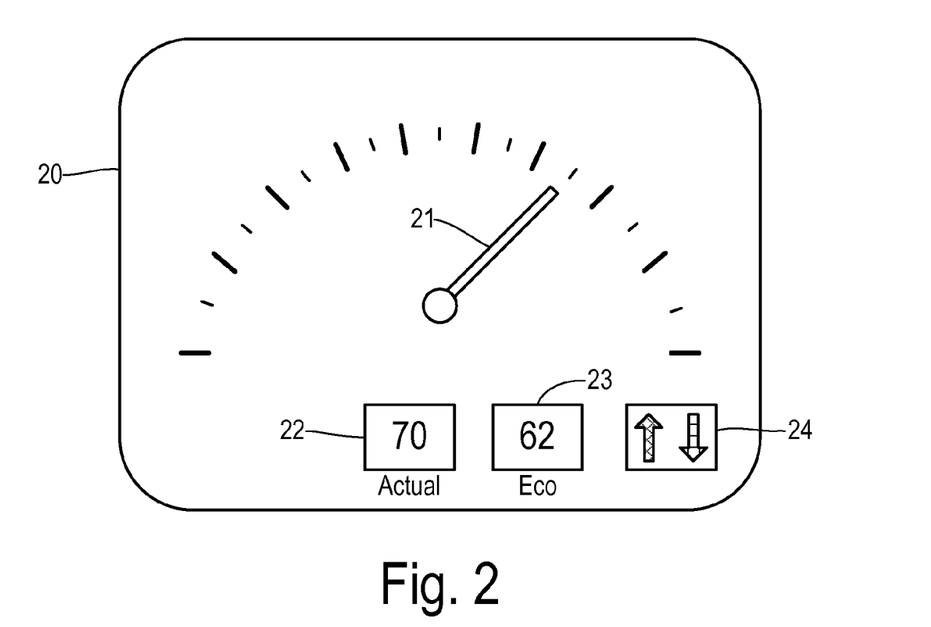
FIG. 2 shows a display of a human machine interface for providing recommended speed profile information to a driver.

FIG. 2 depicts a speedometer 20 which may include an analog gage 21 and/or a digital gage 22 for showing actual vehicle speed to a driver. In some embodiments of the present invention, a recommended target speed may be displayed to the driver so that the driver can manually adjust vehicle speed to match. An eco-speed display 23 numerically depicts a magnitude of the recommended target speed. Alternatively, or in combination with the numeric display, a speed adjustment display 24 may be provided for illuminating respective icons to indicate when an increase or decrease in speed is recommended. Displays 23 and 24 may be included on a vehicle instrument cluster or may preferably be displayed to the driver with a heads-up display (HUD). The human machine interface (HMI) for presenting the target speed or relative speed changes to the driver may also include other haptic or tactile devices such as vibrating contact surfaces (e.g., haptic accelerator pedal or steering wheel) or power assisted operator controls as are known in the art.

Figure 3:
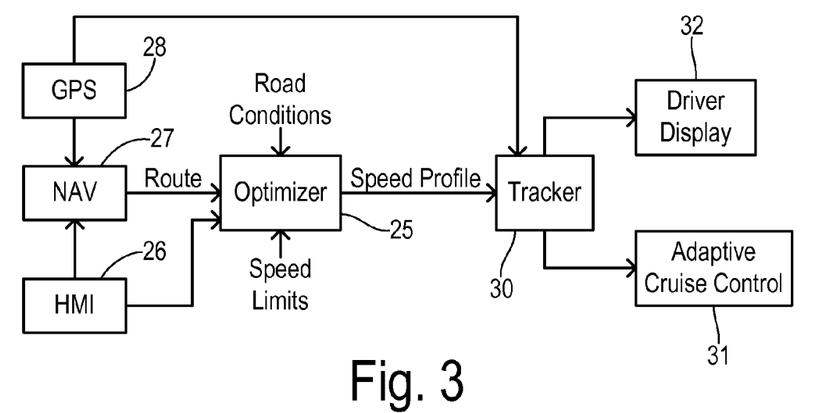
FIG. 3 is a block diagram showing one preferred embodiment of the invention.

A general system for implementing the invention is shown in FIG. 3. An optimizer 25 generates a speed profile based on inputs including road conditions, route, constraining speed limits, and user input from an HMI device 26. The route may be determined from interaction between HMI 26, a navigation unit 27, and a GPS receiver 28.

The recommended speed profile is provided to a location tracker 30 which determines the vehicle's current position (e.g., by using GPS receiver 28) and identifying a target speed contained in the optimal speed profile corresponding to the currently detected location. The target speed is provided to an adaptive cruise control 31 for use as a speed setpoint in order to achieve the recommended target speed, or is provided to a driver display or interface 32 to assist the driver in adjusting vehicle controls to achieve the target speed.

Figure 4:
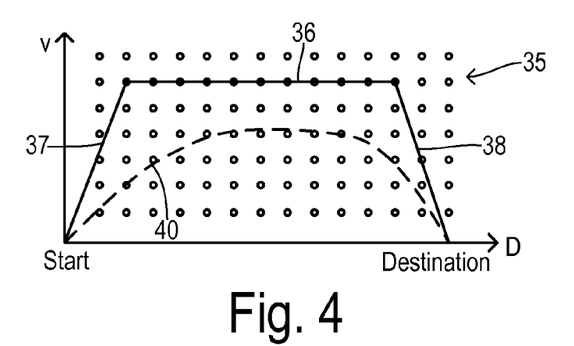
FIG. 4 is a graphic plot showing a space containing feasible speed profiles.
Figure 5:
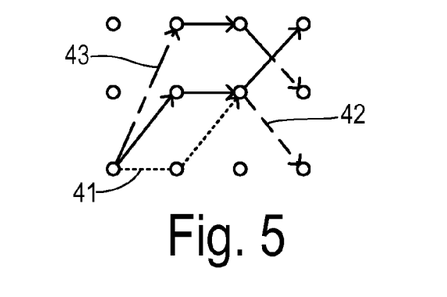
FIG. 5 is a portion of a graphic plot showing several potential speed profiles for comparison.

Optimizer 25 is at least partially located off of the host vehicle (i.e., are cloud-based), as are various elements of the databases or information providing resources utilized by optimizer 25. Many computation procedures are available which may be utilized in calculating an optimal speed profile based on energy consumption models using road grade data and other information. One preferred procedure is as shown in FIG. 4 wherein a grid 35 represents various potential vehicle speeds at each position along a route from a start to a destination. The velocity and distance increments have discrete step sizes providing a sufficiently high resolution to achieve stable results and a robust optimization. Typical resolutions may be about one mile per hour for velocity and 30 meters for distance. A region of feasible speeds can be identified within grid 35 based on a maximum allowable speed portions 36, a maximum acceleration portion 37 and a maximum deceleration portion 38. A speed profile along portions 37, 36, and 38 represents the fastest possible trip, which defines a boundary around a finite space within which an optimal fuel economy solution can be found. Thus, an optimal speed profile is shown at 40 which lies somewhere within the space of feasible trajectories. In order to find this optimal speed profile, dynamic programming may be used based on Bellman's Optimality Principle which evaluates each of the potential trajectories between the starting point and the ending point, and then compares the results to find an optimum profile, or may be based on any other deterministic optimization technique. As shown in FIG. 5, different trajectories 41, 41, and 43 are each evaluated in a very resource intensive process which necessitates the use of off-board computing resources. The dynamic programming method is described, for example in Bertsekas, *Dynamic Programming and Optimal Control*, Third Edition, Athena Scientific, 2005.

Figure 6:
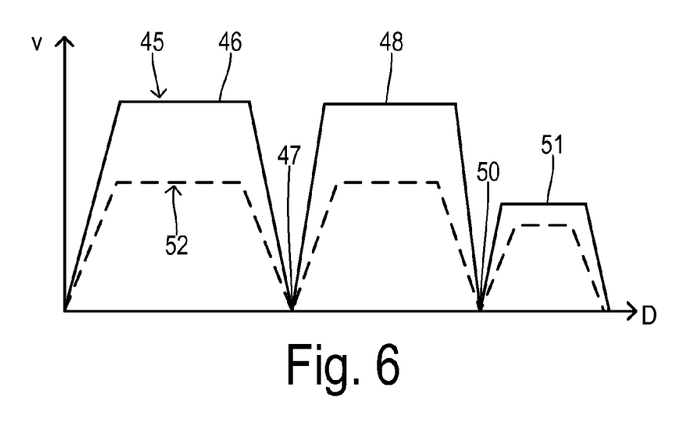
FIG. 6 is a graphic plot showing upper and lower constraints for speed profiles including expected traffic stops along a route.

In addition to maximum speed limit constraints which may be based on legal speed limits and transient road conditions such as rain (i.e., both legal and practical limits), a minimum speed limit or constraint is also employed in order to ensure a travel time less than some fixed amount of time (as well as complying with legal limits). Furthermore, a typical route may include forced stoppages at controlled intersections such as stop signs and traffic lights. The speed constraints may more generally take a form as shown in FIG. 6. A maximum speed trajectory 45 exhibits a first maximum 46 followed by a stoppage 47 and a succeeding maximum 48. After another stoppage 50, a third maximum 51 has a lower magnitude corresponding to a slower speed limit on a particular road segment. As a further constraint on the optimal speed profile, a minimum speed trajectory 52 is provided along the same road segments based on similar considerations such as legal minimum speed, desired travel time, and traffic control devices.

Figure 7:
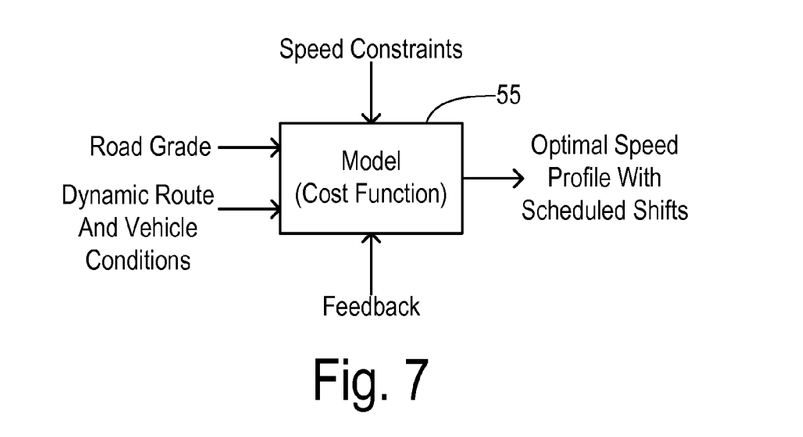
FIG. 7 depicts an energy consumption model and cost function to be evaluated in the present invention.

Maximum and minimum trajectories 45 and 52 define a boundary around a finite set of feasible speed profiles which may be examined by dynamic programming or any other deterministic optimization technique to identify the optimal speed profile. This is achieved using a model 55 as shown in FIG. 7 which mathematically represents a cost function for determining energy consumption according to speed, road grade, and a chosen set of dynamic route and vehicle conditions. The speed constraints are provided to model 55 in order to define the feasible trajectories for examination. The cost function and minimization may be performed as explained in Wollaeger et al, "Cloud-Computing Based Velocity Profile Generation for Minimum Fuel Consumption: A Dynamic Programming Based Solution," *American Control Confer-*

*ence* (*ACC*), 2012, pps. 2108-2113, June 2012, hereby incorporated by reference. For example, a particular make/model of vehicle with an internal combustion engine may be represented by a computational model that relates torque and speed to a specific fuel consumption rate. Among the variables preferably considered in evaluating the fuel consumption are speed, road grade, traffic density, weather conditions, road surface conditions (i.e., smoothness and friction), roadway altitude (i.e., air pressure), transmission shift schedule, and torque converter parameters. A fuel consumption model may be calculated primarily based on an engine torque versus engine speed map with transmission shift points occurring at preset engine speeds as are commonly developed for purposes of calibrating the engine control algorithms. Vehicle power demand is calculated based on how much power is needed to propel the vehicle and overcome other forces including aerodynamic drag, rolling resistance, torque converter inefficiency, accessory loads, and grade changes or other dynamic route and vehicle conditions frequently related to weather conditions. After calculating fuel consumption for each possible speed trajectory within the feasible space, an optimal speed profile is selected. The speed profile may also define the times for scheduled transmission shifts and/or changes in various suspension settings at scheduled times/locations along the route in order to further optimize energy consumption—provided that the model cost function incorporates these variables.

Figure 8:
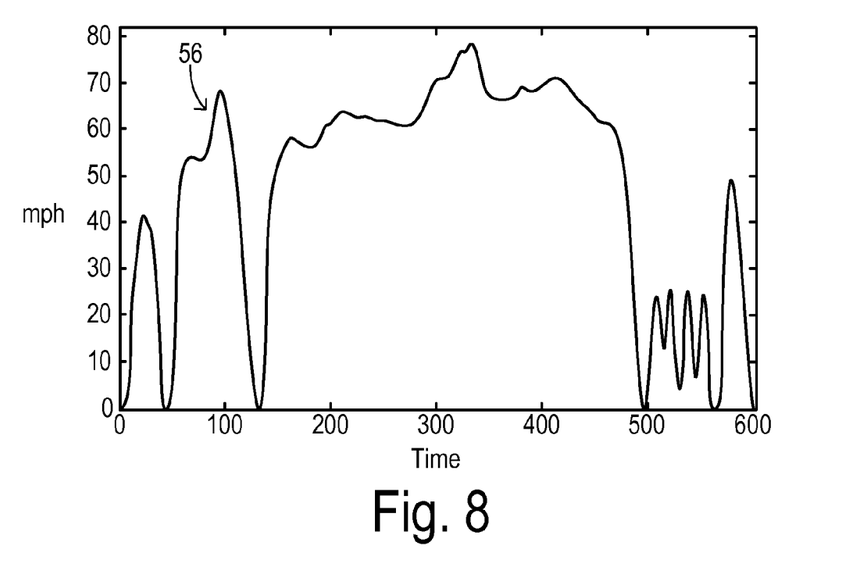
FIG. 8 is a graphic plot of an optimal speed profile.

A graph showing an optimal speed profile identified for a particular route under particular dynamic environmental or vehicle conditions is shown in FIG. 8. For each position or time along the predefined route, a plot 56 specifies the target speed which results in traversing the route with optimized energy consumption.

Figure 9:
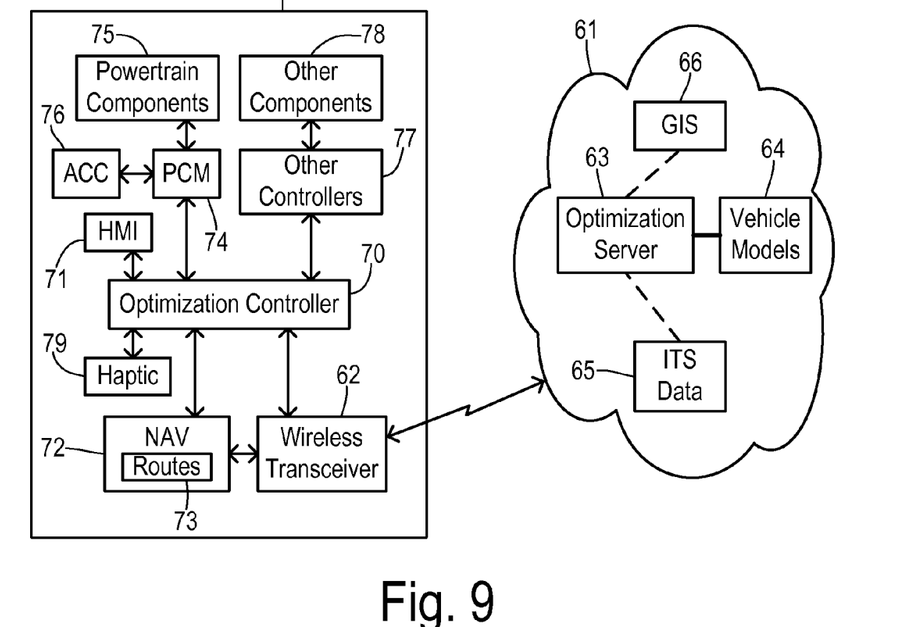
FIG. 9 is a block diagram showing on-board and off-board resources for implementing the invention.

One preferred separation of a system of the invention between a vehicle 60 and an off-board cloud 61 is shown in FIG. 9. Vehicle 60 and cloud 61 define separate domains linked by a wireless transceiver 62 (e.g., cellular, V2I, etc.). All or at least a portion of a speed profile generator or optimizer of the invention is implemented in an optimization server 63 located in cloud 61. A model including a corresponding cost function for vehicle 60 is stored in a vehicle model database 64 connected to or stored within optimization server 63. Variables to be input to the respective computational model by optimization server 63 may be collected from many sources including vehicle 60, an intelligent transportation system (ITS) data source 65, and a geographic information system (GIS) 66.

Vehicle domain 60 provides dynamic information to optimization server 63 such as a route starting point (e.g., current location), final destination, optional waypoints on a route, and vehicle dynamics information such as settings of suspension components, powertrain components, or other vehicle systems that may affect the fuel consumption model. An optimization controller 70 is configured to cooperate with optimization server 63 via wireless transceiver 62. Optimization controller 70 is coupled to an HIM 71 and a navigation system 72 so that a driver may identify a desired destination. Navigation system 72 acts as a route calculator for evaluating different potential routes and selecting an optimum route based on criteria supplied by the driver (or offering several potential routes for selection by the driver). One criterion that may be employed for selecting an optimal route may be a total energy consumption over different respective routes, wherein each consumption amount is determined as described herein.

If the driver does not specify a route, a route can alternatively be predicted automatically by navigation system 72 by performing a comparison between a current path being traveled by the vehicle and commonly-driven routes that have been previously stored in a route database 73 (which may be located in the vehicle or in the cloud). Such routes are unique to vehicle 60 and are based on previous operation by the driver. Using the route and other information supplied via optimization controller 60 and wireless transceiver 62 to optimization server 63, an optimal speed profile is calculated and transmitted back to optimization controller for implementation. As vehicle 60 progresses along the predefined route, optimization controller 70 determines a current location of vehicle 60 using its connection to navigation system 72 (which may includes a GPS receiver and/or dead reckoning system) to identify a target speed corresponding to the current position. The corresponding target speed is supplied to either a powertrain control module 74 containing a speed control system or to HMI 71 for displaying the target speed to the driver.

PCM 74 is coupled to a powertrain component 75 such as a throttle in order to adjust powertrain performance to achieve the target speed where possible. PCM 74 may also be connected to an adaptive cruise control (ACC) system 76 in order to monitor surrounding vehicles as known in the art.

Optimization controller 70 further interacts with other vehicle system controllers 77 such as a transmission or suspension controller which control respective other components 78. For example, an optimal speed profile may include transmission shift points or suspension settings which may be initiated via controller 77.

In addition to a visual or other display of a target speed to the driver via HMI 71, a haptic feedback device 79 (such as a steering wheel or foot pedal vibration unit) may be connected to optimization controller 70 to indicate to the driver a speed update (i.e., increase or decrease) needed to achieve the target speed.

Figure 10:
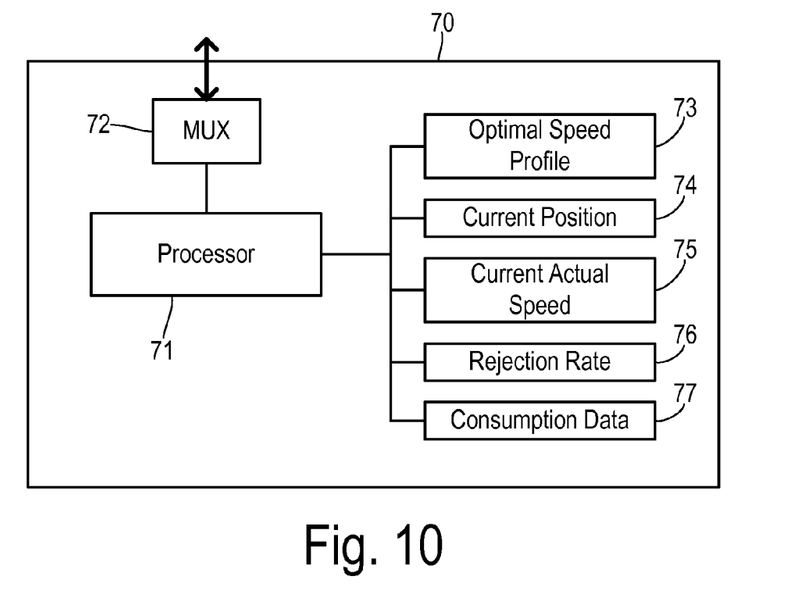
FIG. 10 is a block diagram showing an optimization controller in greater detail.

Optimization controller 70 is shown in greater detail in FIG. 10. A processor 71 may be connected to a vehicle multiplex bus via a node 72 as known in the art. Processor 71 operates on various stored quantities such as an optimal speed profile 73, currently monitored vehicle position 74, current actual vehicle speed 75, a rejection rate 76, and an energy consumption log 77. Optimal speed profile 73 is obtained as described above. Processor 71 uses current vehicle position 74 to extract a respective target speed from profile 73 for communication with other devices via node 72. When a driver indication is being generated according to a relative speed change needed in order to propel the vehicle at the target speed, processor 71 uses actual vehicle speed 75 in comparison with the target speed in order to generate the proper driver indication.

In embodiments where direct control of vehicle speed is not employed and the target speed is only presented to the driver as a recommendation, a rejection rate 76 is obtained in order to adjust the optimal speed profile as described below. The driver may not follow the recommended target speed for many reasons, including the presence of other traffic or safety related conditions that prevent operating at the target speed, or simply because the driver is not comfortable with the recommendation. Different types of drivers may perceive the optimal speed recommendation differently. Unexpected road conditions such as rain or ice may be encountered which force the driver to slow down below the recommended target. Moreover, if the driver consistently rejects the target speed, then the previously calculated optimal speed profile may gradually lose its validity. Moreover, it would be desirable to adjust the speed profile according to whatever conditions or driving style are present in order to better encourage a driving speed that improves fuel economy. Thus, the invention includes an embodiment which continuously evaluates whether the driver is following the recommended speed profile and adjusts the speed constraints accordingly with an adaptive algorithm that learns driver perception of recommended speed and monitors their behavior with respect to the recommendation.

The driver acceptance or rejection of target speed recommendations is quantified by tracking their frequencies. Acceptance and rejection events are complementary, so either the acceptance or rejection frequencies can be calculated. A recursive calculation process determining a weighted frequency of the acceptances (with higher weights being given to more recent observations), can be accomplished by applying a low pass constant gain filter implementing exponential smoothing as follows:

$$R(k)=(1-\alpha)R(k-1)+\alpha \text{ if } v_{min}<v(k)<v_{max}, \text{ and}$$

$$R(k)=(1-\alpha)R(k-1) \text{ if } v(k)<v_{min} \text{ or } v(k)>v_{max}$$

where $\alpha$ is a constant forgetting factor, $0<\alpha\leq1$, and $v_{min}$ and $v_{max}$ define an acceptance zone around the target speed. Forgetting factor $\alpha$ controls the rate of updating the weighted mean R of the events of accepting the system advice.

Figure 11:
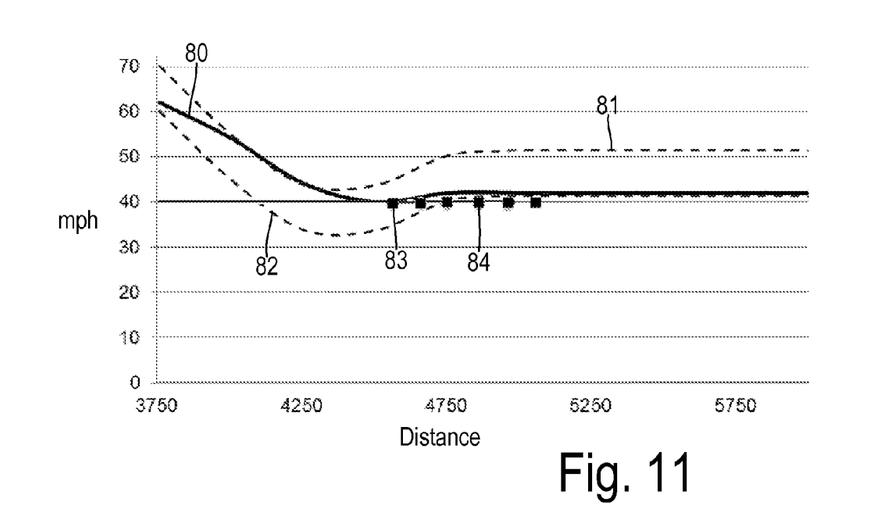
FIG. 11 is a graphic plot showing an optimal speed profile with actual speed as implemented by a driver and an acceptance zone for determining whether the driver is following the recommended profile.

FIG. 11 shows a recommended optimal speed profile 80 which has been calculated between a maximum trajectory 81 and a minimum trajectory 82 for a particular route. A series of squares representing actual vehicle speed data points include a vehicle speed 83 which occurs while the driver is following the target speed recommendation. Later, a vehicle speed 84 has remained at a same speed (e.g., 40 mph) even though the target speed recommendation has gone higher. In addition to diverging from the recommended target by more than an acceptance zone (not shown), the speed at 84 is also below the previously assumed minimum speed trajectory 82. If the rejection of the recommended target persists for a sufficiently long period of time, it becomes desirable to adjust the profile to compensate.

Figure 12:
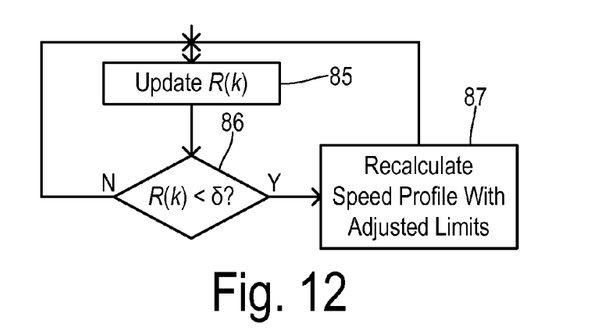
FIG. 12 is a flowchart of a method for updating a speed profile when a current profile is rejected by the driver.

FIG. 12 shows a method of continuously monitoring an acceptance rate for the recommended target speeds during driving along a route. An acceptance rate R is continuously updated in step 85 (e.g., using the formula described above). The acceptance rate is compared to a threshold $\delta$ in step 86. If the acceptance rate has not fallen below threshold $\delta$ then a return is made to step 85 for updating according to future data points. If the acceptance rate is below $\delta$, then the speed profile is recalculated in step 87 with adjusted speed limits. The new speed constraints (maximum and minimum trajectories) may be selected in response to both the legal speed limits and the previous speed performance of the vehicle along the current route.

Figure 13:
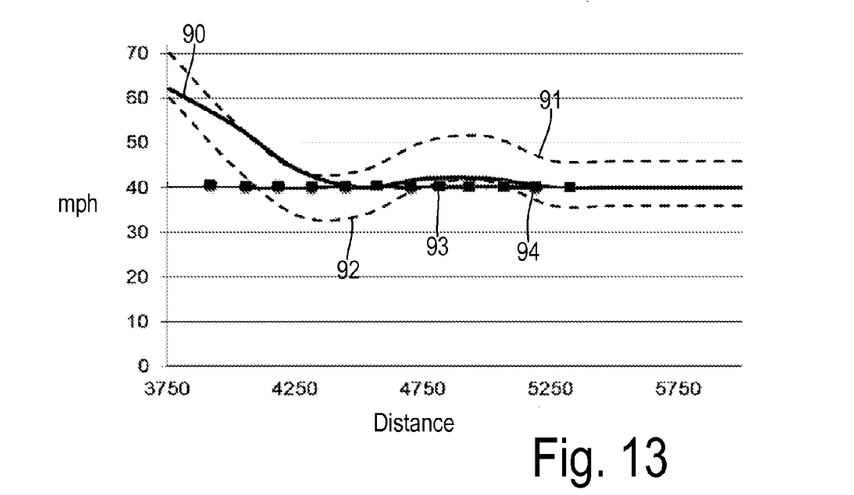
FIG. 13 is a graphic plot showing a revised speed profile to increase driver acceptance.

The result of adjustment of the speed profile during progression along the route is shown in FIG. 13. An optimal speed profile 90 between maximum trajectory 91 and minimum trajectory 92 are shown. Despite the recommended target speeds, the vehicle has continued to operate at a speed of 40 mph at each sample detection. After a vehicle speed measurement 93, an acceptance rate falls below the threshold thereby triggering a recalculation of the optimal speed profile resulting in a dip in maximum and minimum trajectories 91 and 92 after speed measurement 93 (as compared with FIG. 11). Based on the recalculated speed profile, target speeds more consistent with the recommended targets are achieved beginning at velocity measurement 94. In view of the new constraints, the optimum fuel efficiency for the new conditions can now be obtained according to the revised targets.

Figure 14:
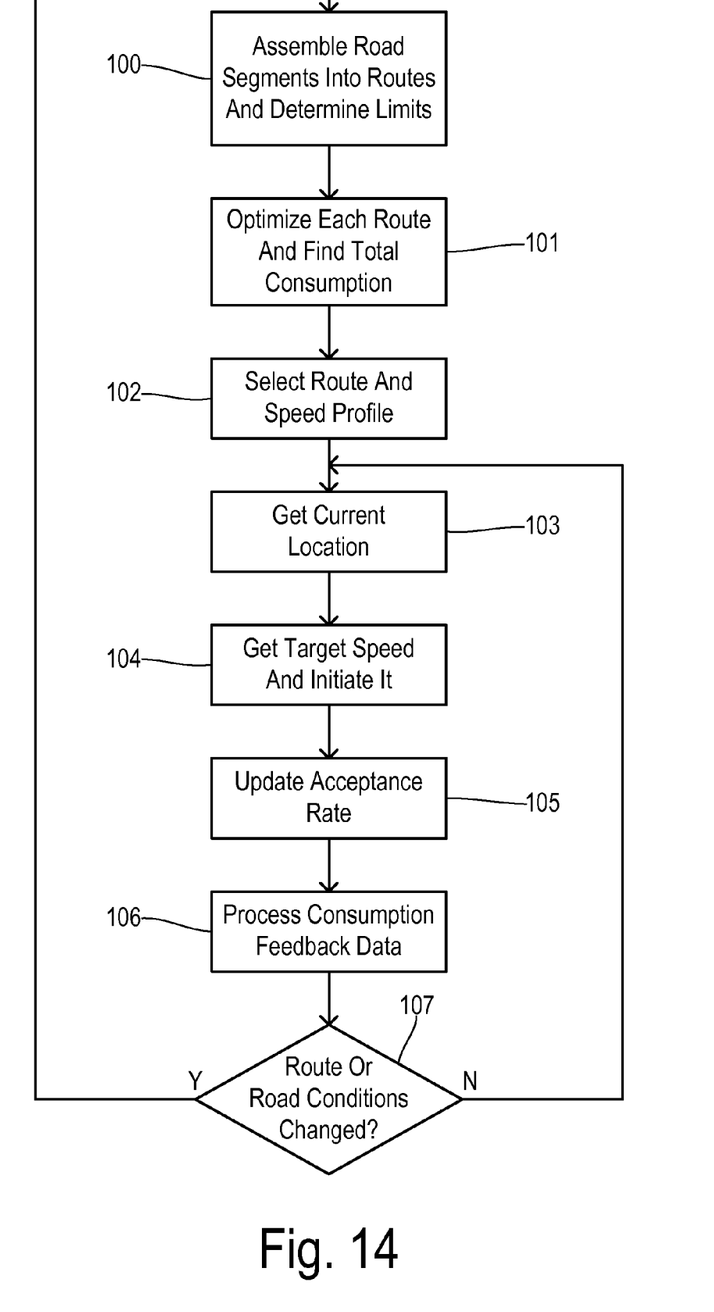
FIG. 14 is a flowchart showing a preferred method of the invention.

Another embodiment of a method of the invention is shown in FIG. 14. After a driver specifies a destination and/or one or more waypoints, a route must be determined. The starting point for the route may be the current position automatically detected by a GPS receiver or can be specified by the driver. Based on criteria specified by the driver such as shortest time or shortest distance, various potential routes are evaluated and the route best conforming to the driver's criteria is selected. In the current embodiment, overall energy consumption for traversing a route may also be used as one of the criteria for route selection. In step 100, road segments from a map database are assembled into different potential routes and the speed limits or other speed constraints for each route are determined. A speed profile is optimized for each route in order to determine total energy consumption in step 101. In step 102, the driver selects their most satisfying route based on all the criteria. The selected speed profile corresponding to the selected route is downloaded to the vehicle to be used in periodically updating the recommended speed while traversing the route. Once driving begins, the on-board optimizer gets the vehicle's current location along the route in step 103. In step 104, it retrieves the target speed and initiates that speed by providing it to a speed updater. The speed updater may include an a cruise control for adopting the target speed as a setspeed or may be comprised of an HMI device for indicating the target speed to the driver or a direction and/or magnitude of a speed change to be made in order to match the target speed.

In step 105, the optimization controller updates an acceptance rate. Also while traversing the route, the vehicle controller may process the energy consumption actually incurred (e.g., fuel being used) and stores it in a log. The consumption data can be periodically transmitted back to the off-board vehicle model and optimization server in order to compare actual energy consumption with predicted energy consumption that was generated by the model. Differences between actual and predicted energy consumption can be used to iteratively improve the model cost function.

In step 107, a check is made to determine whether the route being traversed or any road conditions such as traffic or inclement weather have changed which would affect the validity of the optimal speed profile. If not, then a return is made to step 103 to continue updating the target speed from the speed profile. If conditions have changed, then a return is made to the off-board computing resources to calculate a new optimal speed profile based on the changed conditions. Although a return to step 100 is shown, a recalculation may only have to consider small adjustments to the existing route or to the other input variables to the model cost function that have changed without reinitiating a full route calculation. In any event, the speed profile may be periodically updated while traversing route due to changes in expected traffic, loss of compliance with the target speed by the driver, or other factors so that the best overall fuel economy is obtained while avoiding excessive communication or computational loads.

The present invention includes an alternative embodiment that does not require connectivity of the vehicle during travel along an entire route, but only in specific locations, such as home or a workplace. In this embodiment, frequently-traveled routes are identified by storing a history of GPS locations and the corresponding time of the day while traveling, and uploading the history to the cloud when the vehicle is in one of the locations where it has connectivity. The cloud-based component of the system uses this information in combination with map databases to detect the frequently-traveled routes and build a databases of common routes and their corresponding times of the day. Then, it computes an optimal speed profile for each route and time of the day using geographic information and known historical information for variable driving conditions occurring over the route (such as average traffic flow, weather, etc.). Multiple computations can be performed in order to provide separate optimal speed profiles for different values of the time-changing parameters such as for different weather conditions or traffic density. When the vehicle is in a location with connectivity, the optimal speed profiles are downloaded from the cloud and stored in the vehicle. During driving, the optimizer monitors vehicle location to detect whether one of the frequent routes is being driven. When a stored route is found, the vehicle loads the corresponding optimal speed profile and starts advising the driver on the optimal speed. If the detected route has more than one stored profile based on a time-varying condition, then the current state of the condition is detected and the corresponding profile is selected.

The foregoing invention takes advantage of advances in networked service-oriented computational platforms which have allowed large databases, supervised learning algorithms, vehicle powertrain models, high-dimensional optimization and many other important algorithms that currently require stationary computing platforms. Today's vehicle computers limit features to the relatively low processing power of vehicle computers, small data storage, and lack of access to data created since the vehicle was created. Limited sharing of resources reduces scalability to large numbers of vehicles. Advances in mobile connectivity between vehicles and the computational cloud infrastructure are beginning to enable new classes of electronic features that are not limited in this way.

The wireless connection available for vehicle connectivity is often characterized by variable bandwidth, variable latency, and sporadic connectivity. The in-vehicle computer or ECU is characterized by high reliability, high durability, hard real-time response, low processing power and very small memory (particularly non-volatile memory). The ECU is mobile, lasts the life of the vehicle, and is part of the vehicle purchase. Data created in the ECU tends to be events that have happened in the past on very short time scales. The cloud computers are characterized by high-reliability, high-computational power, large memory and (from the perspective of the vehicle) lack of real-time response. They are stationary, managed systems that are replaced frequently and operate on a lease, own, or fee-for-use basis. Data created in the cloud tends to have a forecast nature that tells what can be expected sometime into the future, rather than what has happened in the past.

The invention determines the optimal speed for fuel efficient travel based on current and past vehicle conditions, vehicle position, bearing and time of day, road network information, traffic information, topographical information, environmental driving conditions, and availability, bandwidth, and latency of a connection between the vehicle and the cloud. In addition, it can precondition the drivetrain for expected driving condition where possible. Driver interfaces such as an emotive driver assistance system or a haptic pedal provide good mechanisms for presenting optimal drive speed information to the driver. They are able to provide the information without causing the driver to move eyes away from the road and in a way that will motivate the driver to reduce fuel consumption. The implementation is scalable to all vehicles in national driving fleets.

Optimal calibration of the drivetrain and the optimal driving speed are highly dependent on the specific driving conditions in which the vehicle is operating. These conditions include the type of road, slope, traffic control, traffic, and weather and driver characteristics. So the optimal calibration and driving speed in San Antonio, Tex. and Denver, Colo. may be very different because San Antonio is at an altitude of 650 feet compared with 5280 feet for Denver and because they have very different climates. Calibration of today's vehicles is detuned so powertrain performance is acceptable under a wide variety of conditions utilizing the low-memory, low-power and real-time efficiency of today's vehicle computers. In the present invention, the optimal driving speed for a vehicle at each point along a route can be computed or retrieved from a database in the cloud along with an optimal calibration map for the vehicle on that route. The optimal driving speed profile and the drivetrain calibration map are downloaded to the vehicle when connectivity is available, and then are used by the computers on the vehicle. Since vehicle computers are small and can only store a few routes at a time, specific routes are selected based on historical information about the driver's route and/or based on origin-destination information provided by the driver. For example, the vehicle location and speed as determined by the GPS is used to determine which route the vehicle is on and where on the route the vehicle is. This can be accomplished using a representation of the route as a parameterized curve passing through the road system. Given a GPS location it is possible to determine the parameter value representing that point on the curve. This parameter is mapped to the appropriate speed and calibration maps that have been provided by the cloud applications for a particular route. The cloud application is able to collect data from the vehicle computers that is time aligned with GPS locations. This data includes vehicle speed, fuel consumption, road grade, driving style and various road conditions—and is used to compute future vehicle speed and powertrain calibration maps. The cloud application also collects data from cloud information providers such as weather forecasters, map providers, and traffic information providers to build its vehicle speed and calibration maps.

What is claimed is:

1. A system for optimizing energy consumption of a vehicle, comprising:
   a route calculator for assembling road segments into a route from a first position to a destination;
   a speed profile generator located at least partially off of the vehicle and using an energy consumption model of the vehicle together with road grade data corresponding to the route to calculate an optimal speed profile that specifies target speeds for respective locations on the route for traversing the route with an optimized energy consumption, wherein the speed profile generator compares energy consumption for a plurality of feasible speed profile trajectories between a maximum trajectory and a minimum trajectory in order to identify the optimal speed profile; and
   a speed updater responsive to a current position of the vehicle and the optimal speed profile to initiate a target speed specified for the current position.

2. The system of claim 1 wherein the speed profile generator periodically updates the optimal speed profile while traversing the route.

3. The system of claim 1 wherein the speed updater is comprised of an adaptive cruise control system that uses the target speed for the current position as a speed setpoint.

4. The system of claim 1 wherein the speed updater is comprised of an HMI device for indicating to a driver the target speed or a speed change to be made to obtain the target speed.

5. The system of claim 4 wherein the HMI device is a graphic display showing a numeric value of the target speed.

6. The system of claim 4 wherein the HMI device is a graphic display having a visual characteristic for indicating whether a speed increase or a speed decrease is required to obtain the target speed.

7. The system of claim 1 wherein the speed profile generator determines the maximum trajectory in response to a legal speed limit corresponding to the road segments.

8. The system of claim 1 wherein the speed profile generator determines the minimum trajectory in response to traffic control stops along the road segments.

9. The system of claim 1 further comprising a wireless data transceiver in the vehicle for communicating with a remote server, wherein the remote server includes at least a portion of the speed profile generator.

10. The system of claim 9 further comprising an energy consumption monitor generating energy usage data resulting from the optimal speed profile, wherein the energy usage data is sent by the wireless data transceiver to the remote server so that the speed profile generator refines the energy consumption model.

11. The system of claim 1 wherein the route calculator includes an input device for use by a driver to identify the destination.

12. The system of claim 1 wherein the route calculator includes:
a location tracking device for monitoring the current position of the vehicle; and
a recognition unit storing routes commonly traversed by the vehicle and comparing a current path of the vehicle to the stored routes to select a current route.

13. The system of claim 1 wherein the route calculator assembles the road segments into the route in response to evaluating optimized energy consumption calculated for a plurality of possible routes between the first position and the destination.

14. The system of claim 1 wherein the energy consumption model calculates the optimal speed profile further in response to route conditions selected from the group of traffic density, weather conditions, road surface conditions, altitude, transmission shift schedule, and torque converter operation.

15. The system of claim 1 wherein the optimal speed profile further specifies transmission settings.

16. The system of claim 1 wherein the optimal speed profile further specifies suspension settings.

17. The system of claim 1 wherein the route calculator determines a plurality of frequently-traveled routes based on a history of a vehicle location, time of day, and driving conditions, wherein the speed profile generator calculates a respective optimal speed profile for the frequently traveled routes, wherein the optimal speed profiles are downloaded to the vehicle, and wherein the speed updater uses one of the downloaded optimal speed profiles in response to detecting travel of the vehicle along one of the frequently-traveled routes at a corresponding time of day and driving conditions.

18. A method for optimizing energy consumption of a vehicle, comprising:
assembling road segments in a navigation system into a route from a first position to a destination;
evaluating an energy consumption model of the vehicle together with road grade data corresponding to the route to calculate an optimal speed profile that specifies target speeds for respective locations on the route for traversing the route with an optimized energy consumption, wherein energy consumption is compared for a plurality of feasible speed profile trajectories between a maximum trajectory and a minimum trajectory in order to identify the optimal speed profile, wherein the evaluating is performed off of the vehicle by a remote server, and wherein the vehicle communicates wirelessly with the remote server to receive the optimal speed profile;
indicating to a driver on an HMI device a specified target speed or a speed change to be made to obtain the specified target speed in response to a current position of the vehicle and the optimal speed profile:,
determining an acceptance rate of the target speed by a driver by comparing an actual speed with an acceptance zone around the target speed in a processor; and
if the determined acceptance rate is below a threshold, then recalculating the optimal speed profile using revised maximum and minimum trajectories that are selected to increase the acceptance rate.

19. The method of claim 18 wherein the optimal speed profile is periodically updated while traversing the route.

20. The method of claim 18 wherein the initiating step is comprised of displaying a numeric value of the target speed.

21. The method of claim 18 wherein the initiating step is comprised of displaying a visual characteristic for indicating whether a speed increase or a speed decrease is required to obtain the target speed.

22. The method of claim 18 wherein the acceptance rate R(k) is successively determined for each successive target speed k according to a formula:

$$R(k)=(1-\alpha)R(k-1)+\alpha \text{ if } v_{min} < v(k) < v_{max}, \text{ and}$$

$$R(k)=(1-\alpha)R(k-1) \text{ if } v(k) < v_{min} \text{ or } v(k) > v_{max}$$

where $\alpha$ is a constant forgetting factor, $0<\alpha \leq 1$, $v(k)$ is the actual speed, and $v_{min}$ and $v_{max}$ define an the acceptance zone around the target speed.

23. The method of claim 20 wherein the maximum trajectory is determined in response to a legal speed limit corresponding to the road segments.

24. The method of claim 18 wherein the minimum trajectory is determined in response to traffic control stops along the road segments.

25. The method of claim 18 further comprising the steps of:
monitoring the energy consumption to generate energy usage data resulting from the vehicle using the optimal speed profile;
wirelessly sending the energy usage data to the remote server; and
refining the energy consumption model in response to the energy usage data.

26. The method of claim 18 further comprising the step of a driver manually inputting the destination.

27. The method of claim 18 further comprising the steps of:
tracking the current position of the vehicle; and
comparing a current path of the vehicle to a plurality of stored routes commonly traversed by the vehicle to select the current route.

28. The method of claim 18 wherein the road segments assembled into the route are selected in response to evaluating optimized energy consumption calculated for a plurality of possible routes between the first position and the destination.

29. The method of claim 18 wherein the energy consumption model calculates the optimal speed profile further in response to route conditions selected from the group of traffic density, weather conditions, road surface conditions, altitude, transmission shift schedule, and torque converter operation.

30. The method of claim 18 wherein the optimal speed profile further specifies transmission settings.

31. The method of claim 18 wherein the optimal speed profile further specifies suspension settings.

32. The method of claim 18 wherein assembling the route includes determining a plurality of frequently-traveled routes based on a history of a vehicle location, time of day, and driving conditions, wherein a plurality of optimal speed profiles are calculated for the frequently traveled routes, and wherein the method further comprises the step of detecting travel of the vehicle along one of the frequently-traveled routes at a corresponding time of day and driving conditions and selecting the corresponding optimal speed profile to determine the target speed.

33. A system for optimizing energy consumption of a vehicle, comprising:
- a route calculator for assembling road segments into a route from a first position to a destination;
- a speed profile generator located at least partially off of the vehicle and using an energy consumption model of the vehicle together with road grade data corresponding to the route to calculate an optimal speed profile that specifies target speeds for respective locations on the route for traversing the route with an optimized energy consumption, wherein the speed profile generator compares energy consumption for a plurality of feasible speed profile trajectories between a maximum trajectory and a minimum trajectory in order to identify the optimal speed profile;
- a speed updater responsive to a current position of the vehicle and the optimal speed profile to initiate a target speed specified for the current position, the speed updater is comprised of an HMI device for indicating to a driver the target speed or a speed change to be made to obtain the target speed; and
- a monitor for determining an acceptance rate of the target speed by the driver;
- wherein, if the determined acceptance rate is below a threshold, then the speed profile generator recalculates the optimal speed profile using revised maximum and minimum trajectories that are selected to increase the acceptance rate.

34. The system of claim 33 wherein the acceptance rate $R(k)$ is successively determined for each successive target speed k according to a formula:

$$R(k)=(1-\alpha)R(k-1)+\alpha \text{ if } v_{min} < v(k) < v_{max}, \text{ and}$$

$$R(k)=(1-\alpha)R(k-1) \text{ if } v(k) < v_{min} \text{ or } v(k) > v_{max}$$

where $\alpha$ is a constant forgetting factor, $0 < \alpha \leq 1$, $v(k)$ is the actual speed, and $v_{min}$ and $v_{max}$ define an acceptance zone around the target speed.

* * * * *